United States Patent
Hellander

(10) Patent No.: US 6,445,918 B1
(45) Date of Patent: Sep. 3, 2002

(54) METHOD AND SYSTEM FOR SAVING DROPPED CALLS

(75) Inventor: Bo Hellander, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/431,671

(22) Filed: Nov. 1, 1999

(51) Int. Cl.[7] .............................. H04Q 7/20; H04Q 7/34
(52) U.S. Cl. .................... 455/423; 455/432; 455/424; 455/436; 455/437; 455/438; 455/439; 455/422; 370/331; 370/332
(58) Field of Search .................. 455/422, 423, 455/424, 425, 432, 433, 434, 435, 436, 437, 438, 439, 440, 442, 443, 444, 445, 456, 457, 8, 500, 513, 514, 515, 517, 63, 67.1, 550, 555, 560; 370/331, 332, 333

(56) References Cited

U.S. PATENT DOCUMENTS

| | | | | |
|---|---|---|---|---|
| 4,811,380 A | * | 3/1989 | Spear | 455/432 |
| 5,771,275 A | * | 6/1998 | Brunner et al. | 455/432 |
| 5,913,167 A | * | 6/1999 | Bonta et al. | 455/436 |

FOREIGN PATENT DOCUMENTS

| | | |
|---|---|---|
| EP | 0 871 315 A1 | 10/1998 |
| EP | 0 871 316 A1 | 10/1998 |
| EP | 0 871 340 A2 | 10/1998 |
| WO | WO 94/28689 | 12/1994 |
| WO | WO 97/24897 | 7/1997 |
| WO | WO 99/55022 | 10/1999 |

OTHER PUBLICATIONS

Standard Search Report for RS 104054US Completed Apr. 5, 2000.

* cited by examiner

Primary Examiner—William Trost
Assistant Examiner—Keith Ferguson
(74) Attorney, Agent, or Firm—Jenkens & Gilchrist, P.C.

(57) ABSTRACT

A method and system for reconnecting dropped calls in a mobile telecommunications network. Upon detecting a call drop of an ongoing call, a mobile station involved in the call transmits a call reconnect request to a target cell in the network. The target cell can be selected from a neighboring cell list received from a serving cell during the call. In response to the call reconnect request, a target switching node associated with the target cell locates the call and reconnects the mobile station to the call using a traffic channel in the target cell.

24 Claims, 6 Drawing Sheets

METHOD AND SYSTEM FOR SAVING DROPPED CALLS

BACKGROUND OF THE INVENTION

1. Technical Field of the Invention

The present invention relates in general to call connections in a telecommunications network, and in particular to saving dropped calls in the mobile telecommunications environment.

2. Description of Related Art

Because cellular telecommunications systems rely upon a radio interface for communications between a fixed base station and a mobile subscriber, failures or interruptions in the radio path between the base station and the mobile subscriber frequently result in dropped calls, wherein an ongoing call connection is eventually terminated because of an inability of the base station and mobile station to communicate with one another. In particular, if an ongoing call experiences a semi-permanent radio path failure (i.e., a radio path failure in which radio communications are interrupted for more than an inconsequential period of time), the mobile station and/or the cellular system will generally terminate the call connection. Such radio path failures can be due to, for example, broken base station equipment, a base station power outage, a transport network outage, software faults in the radio base station, or radio path disturbances.

One of the primary problems with dropped calls is that they inconvenience subscribers by requiring them to set up the call again, which can result in subscriber dissatisfaction. Furthermore, if dropped calls occur frequently enough, subscribers may be more reluctant to use their mobile telephones, effectively reducing the amount of revenues that the mobile telecommunication service provider generates.

In most cases, when a call is dropped, no effort is made to save the call connection. Instead, the subscriber must reinitiate the call. Some solutions for reconnecting involuntarily disconnected calls have been suggested. For example, Spear, U.S. Pat. No. 4,811,380, offers a solution to the problem of the mobile station not receiving a handoff message. In particular, when the system determines that a handoff from a first base site coverage area to a second base site coverage area is required, the first base site transmits the handoff message to the mobile station. If the mobile station does not receive the message, the mobile station determines that the call has been lost, seizes a signaling channel from the second base site, and requests a call re-connection via the second base site. The second base site informs the mobile station of the handoff instruction and the handoff is completed with a successful re-connection of the call. Spear, however, does not disclose how the mobile station locates the signaling channel for the second base site. Scanning for the appropriate signaling channel would require too much time. Therefore, the only option is for the mobile station to send the reconnect message on a signaling channel of a base site where the call was originally set up. However, in cases where one or more inter-base site handoffs have been performed, the mobile station is typically out of range of the original base site. Thus, Spear does not describe a feasible solution to the problem.

Alternatively, industry standard TIA/J-STD-034 describes a proposed solution for a connection of dropped emergency calls. This proposed solution, however, is network initiated and basically involves the network establishing a new connection with the mobile station by calling back the mobile station if the call is dropped. One of the main drawbacks of this proposed is solution is that, after the network detects that the connection to the mobile station has been lost, the network will have to wait until the mobile station becomes idle and returns to the control channel (i.e., when the subscriber pushes the "on-hook" button on the mobile station) before it can initiate the call back procedure. Then, the mobile station can be paged as a normal terminating call, and the subscriber will receive a ring tone and have to manually answer the new call. An additional drawback of this proposed solution is that, if the mobile station is no longer within the same coverage area, the network probably will not be able to locate the mobile station to place the new call.

There is a need, therefore, for a method and system for reconnecting dropped calls in a mobile telecommunications network. Such a method and system would preferably allow a call connection to be reestablished promptly and without the need to manually initiate a new call. Furthermore, the method and system would allow for reconnection in cases where the mobile station has moved from one coverage area to another.

SUMMARY OF THE INVENTION

The present invention comprises a method and system for reconnecting dropped calls in a mobile telecommunications network. Upon detecting a call drop or loss of radio contact between a mobile station and a serving communication station, the mobile station sends a call reconnect request to the mobile telecommunications network. The call reconnect request is sent via a control channel of a target communication station, and in one embodiment of the invention, the control channel and/or its associated target communication station are selected from a neighboring cell list received by the mobile station. In response to the call reconnect request, the network reconnects the mobile station to the call using a radio channel of the target communication station.

In accordance with another embodiment of the invention, the call reconnection can be performed in situations in which the target communication station is associated with a target switching node that differs from a serving switching node associated with the serving communication station. Upon receiving the call reconnect request, the target switching node locates a switching node that is involved in the call by contacting a home location register for the mobile station and/or by contacting an anchor switching node for the call. The target switching node then requests a handoff of the call from the switching node involved in the call to the target switching node. Alternatively, the target switching node requests a handoff of the call from each of the border switching nodes. If one of the border switching nodes is currently serving the call, that border switching node hands off the call to the target switching node. Once the call is handed off to the target switching node, the mobile station can be reconnected with the call.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
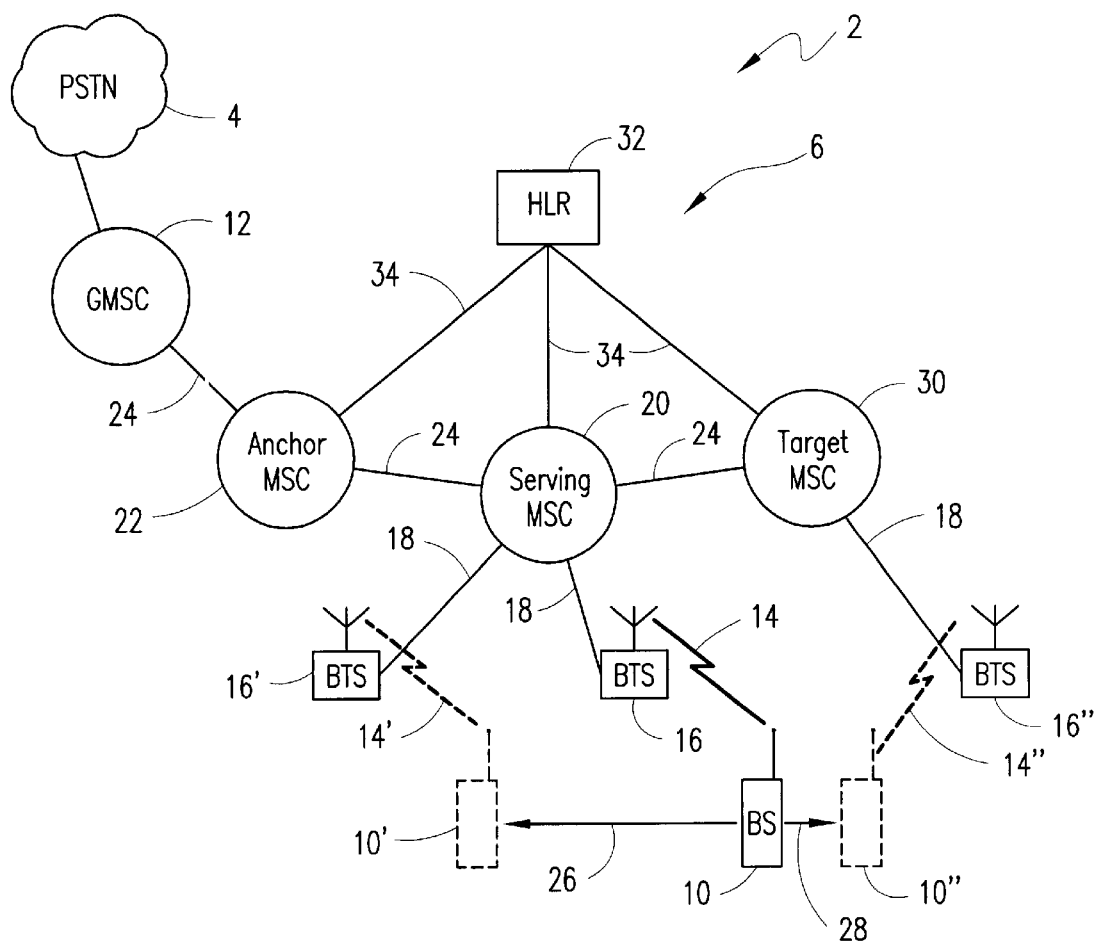
FIG. 1 is a telecommunications system suitable for use in connection with the present invention.

Reference is now made to the Drawings wherein like reference characters denote like or similar parts throughout the various Figures. Referring now to FIG. 1, there is illustrated a telecommunications system 2 suitable for use in connection with the present invention. Although the invention is described herein, and depicted in the Figures, in the context of a TIA/EIA-41 system using an IS-136 (TDMA) air interface, it will be understood by those of ordinary skill in the art that the invention is also applicable in other types of systems, such as GSM and PDC systems.

The telecommunications system 2 includes a Public Switched Telephone Network (PSTN) 4 and a mobile telecommunications network 6. The PSTN 4 is linked to the mobile telecommunications network 6 by a gateway mobile switching center (GMSC) 12, through which calls between mobile stations 10 in the mobile telecommunications network 6 and subscriber stations in other networks are routed. The mobile telecommunications network 6 also includes a plurality of other mobile switching centers (MSCs). Although only four MSCs are depicted in the Figure, a mobile telecommunications network can include a larger number of MSCs. The MSCs are connected to one another via inter-exchange signaling and traffic connections 24. Generally, each MSC controls a plurality of radio base stations (RBSs) 16. Among other things, the MSC for a particular coverage area controls the allocation of traffic channels at each RBS 16 that the MSC controls. Furthermore, each MSC functions to route calls through the mobile network 6. In this example, each RBS 16 serves a cell within the coverage area for its controlling MSC. In addition, a home location register (HLR) 32 associated with each mobile station 10 stores subscriber profile data and other data relating to the subscriber, such as a current location of the mobile station 10. Such data is accessible by the MSCs via signaling links 34.

With respect to a mobile station 10 that is involved in an ongoing call, communications are conducted over an air interface 14 with a radio base station (RBS) 16. The RBS 16 is further connected to a serving MSC 20 via a signaling and traffic connection 18. The serving MSC 20 is the MSC through which the ongoing call is presently set-up (i.e., the MSC that serves the area in which the mobile station 10 is currently located). An anchor MSC 22 is the MSC through which the call was initially set-up or, alternatively, an MSC in which the mobile station 10 most recently registered. Accordingly, if there has not been an inter-exchange handoff of the mobile station 10 during the ongoing call, in which the call is handed off to an RBS 16 controlled by a different MSC, the anchor MSC 22 is the same as the serving MSC 20. Call connections can involve another mobile subscriber within the mobile telecommunications network 6 or can be connected via the PSTN 4 to a wireline or mobile subscriber in another network.

As the mobile station 10 moves through the mobile telecommunications network 6, it eventually becomes necessary to hand off the mobile station 10 from one RBS 16 to another. By monitoring signal strength measurements of signals between the mobile station 10 and one or more RBSs 16, the mobile network 6 determines when handoff is necessary and to which RBS 16 the mobile station 10 should be handed off. In some cases, the mobile station 10 needs to be handed off (as indicated at 26) to a target cell within the coverage area of the currently serving MSC 20. In such a case, the serving MSC 20 directs the handoff of the mobile station 10' to the RBS 16' for the target cell. Communications with the mobile station 10' in the target cell are then conducted via an air interface 14'.

In other cases, the mobile station 10 needs to be handed off (as indicated at 28) to a target cell within the coverage area of a target MSC 30. In such a case, the serving MSC 20 communicates with the target MSC 30, via an inter-exchange signaling and traffic connection 24, to carry out the handoff of the mobile station 10" to the RBS 16" for the target cell. Communications with the mobile station 10" in the target cell are then conducted via an air interface 14" in the new exchange.

During an ongoing call, the mobile station 10 communicates via a digital traffic channel (DTC) of the air interface 14. In addition, in accordance with mobile-assisted handoff (MAHO) procedures, the serving RBS 16 periodically transmits a neighboring cell list via the serving RBS's digital traffic channel (DTC) (i.e., in a logical subchannel of the DTC, such as the FACCH or SACCH). The neighboring cell list includes an identification of the neighboring cells and the digital control channels (DCCHs) that are associated with those cells. The mobile station 10 uses the information in the neighboring cell list to periodically measure the signal strength of DCCH signals transmitted by RBSs 16 in the neighboring cells. The measurements can be performed during idle timeslots, i.e., timeslots during which the mobile station neither transmits nor receives signals of the ongoing call. Thus, the mobile station 10 is able to identify which one of the neighboring cells would provide the best service at any given time by comparing the signal strength and/or quality of these measurements.

Generally, a radio path failure between the mobile station 10 and a serving RBS 16 can cause a call drop, which can occur at any time during a call connection (i.e., during an intra-exchange handoff, during an inter-exchange handoff, or during normal communications between the mobile station 10 and the RBS 16). Such a call drop does not typically cause the ongoing call to be immediately terminated; instead, the call connection is maintained, at least between the serving MSC 20 and the other party to the call, for a short period of time. In accordance with the invention, there is introduced a new parameter "Reconnect" as an optional information element, within the existing "Origination" message, that is used to reconnect the dropped call. The "Origination" message is sent from the mobile station 10 to a target RBS 16 via a random access channel (PACH) of the target RBS's DCCH.

When the mobile station 10 detects that the call has been dropped, the mobile station 10 identifies the best neighboring (target) cell based on the previously performed MAHO measurements, tunes to the target cell's DCCH, and sends an "Origination-Reconnect" message to the mobile telecommunications network 6 via an appropriate RACH. In particular, the "Origination-Reconnect" message is sent via the RACH for the neighboring (target) cell that is currently identified as being able to provide the best service. The mobile telecommunications network 6 then responds to the "Origination-Reconnect" message by reestablishing the radio connection with the mobile station 10 using a traffic channel in the target cell to reconnect the ongoing call. Using the invention, the mobile station 10 can request reconnection as soon as it is able to tune to a control channel, and reconnection can be accomplished without having to wait for the mobile station 10 to return to an "on-hook" state.

In accordance with one embodiment of the invention, the target cell that receives the "Origination-Reconnect" message is associated with the currently serving MSC 20. In such a case, the serving MSC 20 is able to directly identify the ongoing call in which the mobile station 10 was involved prior to the call drop. Thus, the serving MSC 20 is able to directly assign a traffic channel in the target cell for use by the mobile station 10 without involving other MSCs. The serving MSC 20 can then reestablish radio communications with the mobile station 10 in the target cell and can reconnect the mobile station 10 to the ongoing call.

In accordance with another embodiment of the present invention, the target cell that receives the "Origination-Reconnect" message is associated with a different (target) MSC 30 than the serving MSC 20 through which the call is presently routed. In this case, the target MSC 30 communicates with the HLR 32 and the anchor MSC 22 to identify the serving MSC 20 and then requests that the serving MSC 20 handoff the call to the target MSC 30. Once the call is handed off, the target MSC 30 can reestablish radio communications with the mobile station 10 in the target cell and can reconnect the mobile station 10 to the ongoing call.

Figure 2:
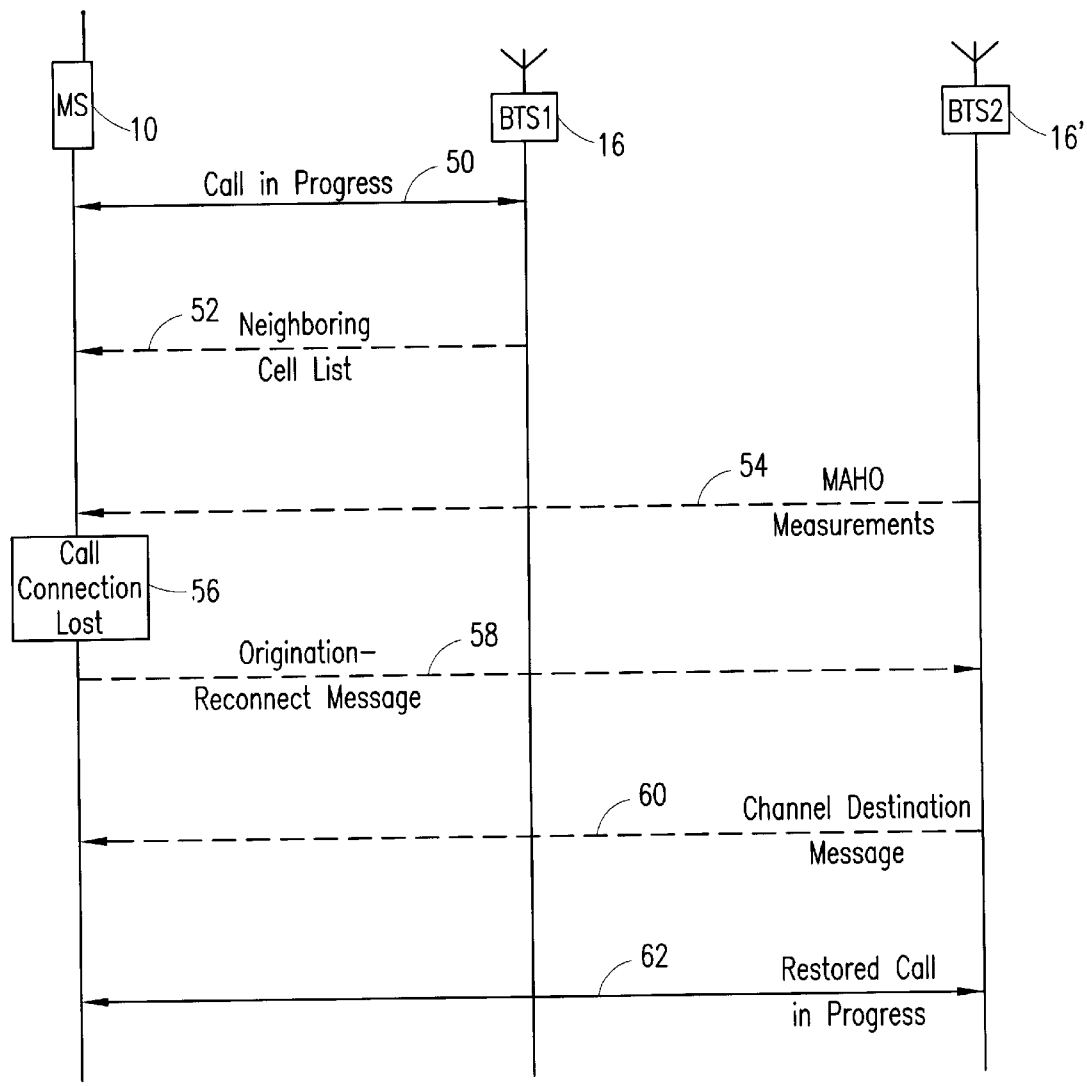
FIG. 2 is a message flow and signaling diagram for reconnecting a dropped call in connection with one embodiment of the present invention.

Referring now to FIG. 2, there is illustrated a message flow and signaling diagram for reconnecting a dropped call in connection with a first embodiment of the present invention. As indicated at 50, a call involving a mobile station 10 is in progress. During the call, radio communications between the mobile station 10 and a first (serving) radio base station (RBS1) 16 are conducted using a traffic channel (as indicated by a solid line). The communications are further routed via a signaling and traffic connection 18 to a serving MSC 20. The serving MSC 20, in turn, routes the call through a GMSC 12 to a party in a PSTN 4 or to another party within the mobile network 6 (see FIG. 1).

Also during the call, the first RBS 16 periodically transmits a neighboring cell list 52 to the mobile station 10 via the traffic channel (as indicated by a dashed line), using the well-known blank and burst technique, for example. The neighboring cell list 52 identifies the control channel and its frequency for each of the cells that neighbor the serving cell. The neighboring cells are selected as being potential candidates for handoff of the mobile stations. Using this information, the mobile station 10 makes periodic mobile assisted handoff (MAHO) measurements 54 on the control channel signal being broadcast by each neighboring cell. In particular, the mobile station 10 measures the quality or strength of the signals on neighboring cell control channels.

At step 56, a radio path failure occurs causing the call in progress to be dropped. When the call is dropped, however, the entire call connection is not immediately lost. Instead, only the radio connection (i.e., between the mobile station 10 and the first RBS 16) is affected; the connection between the serving MSC 20 and the other party to the call is maintained. Although this latter connection is not maintained indefinitely, it is maintained long enough to enable the call to be reconnected in accordance with the present invention.

Upon detecting the call drop, the mobile station 10 selects and tunes to a suitable control channel from the neighboring cell list received at 52 by identifying a control channel having an acceptable signal strength, as determined from the previously made MAHO measurements 54. Preferably, the mobile station 10 selects the control channel having the highest measured signal strength. In this case, the selected control channel is associated with a second radio base station (RBS2) 16' that is controlled by the currently serving MSC 20 (i.e., the same MSC that controls the first RBS 16).

The mobile station 10 then sends an "Origination-Reconnect" message 58 over the selected control channel, or more precisely, on the RACH, to request that the call be reconnected. Because the second RBS 16' is controlled by the same MSC (the serving MSC 20) as the first RBS 16, the serving MSC 20 is already in control of the ongoing call and is maintaining a connection with the other party. As a result, the serving MSC 20 can determine that the received "Origination-Reconnect" message 58 constitutes a request to reconnect the mobile station 10 with that ongoing call. Accordingly, the serving MSC 20 assigns a new traffic channel in the cell of the second RBS 16' for use by the mobile station 10, and the second RBS 16' sends a "Channel Destination" message 60 identifying the assigned traffic channel to the mobile station 10. By tuning to the assigned traffic channel, the mobile station 10 can then reconnect to the ongoing call at 62, thereby restoring the call in progress.

In the case of a TDMA system, the first embodiment of the invention, as described in connection with FIG. 2, can be implemented by simply adding the "Reconnect" parameter to the existing IS-136 protocol and modifying the processing capabilities within the MSC as well as the operational software in the mobile station 10. In other words, the first embodiment of the invention can be implemented without necessitating any changes to inter-exchange messages. In cases where the mobile station 10 is moving into a coverage area served by a different MSC, however, it will be necessary to introduce new parameters and/or messages to the inter-exchange protocols. These new parameters and/or messages can be introduced by modifying existing inter-exchange standard protocols, such as TIA/EIA-41, or by adding new inter-exchange capabilities on a vendor-by-vendor basis.

Figure 3:
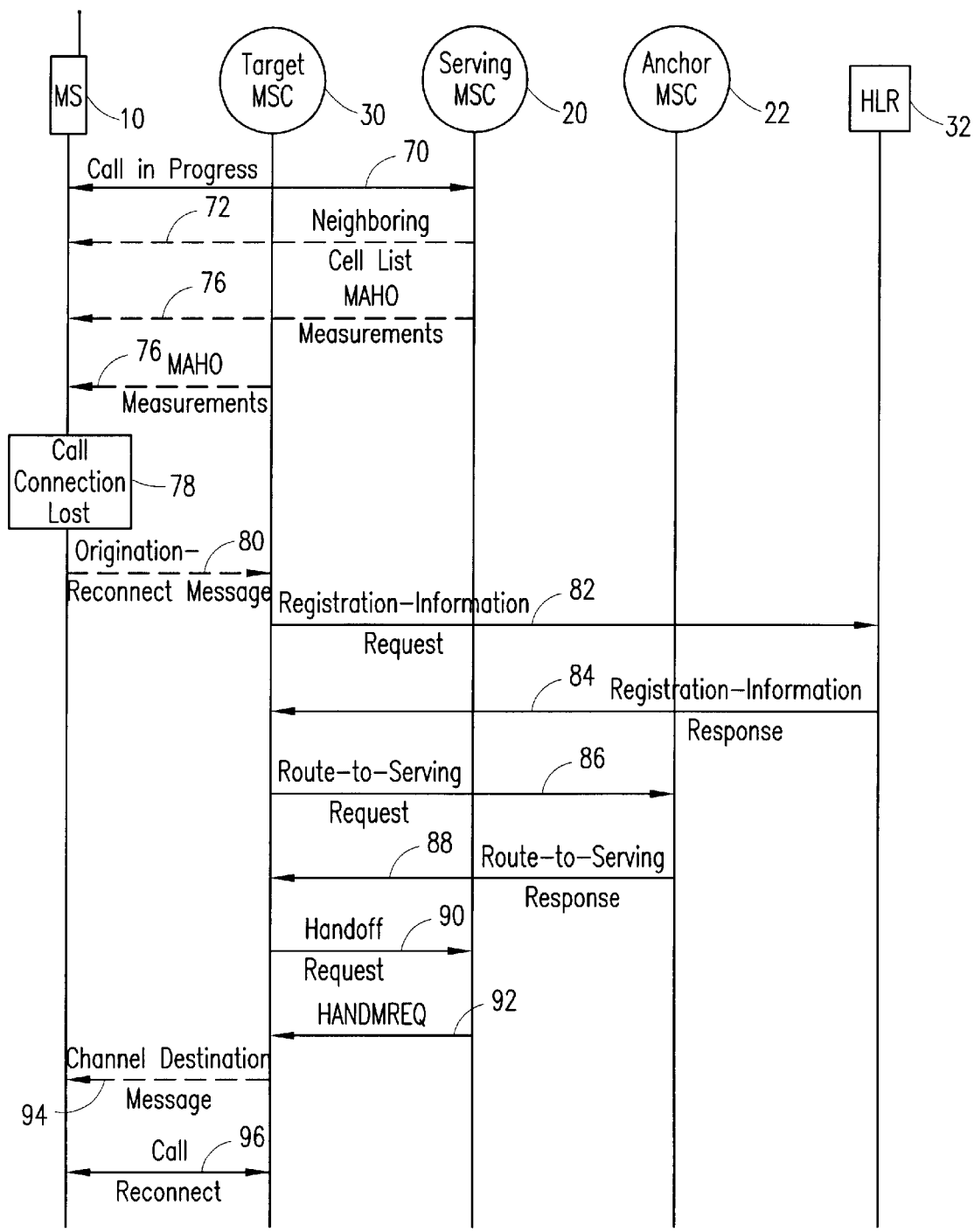
FIG. 3 is a message flow and signaling diagram for reconnecting a dropped call in connection with an alternative embodiment of the present invention.

Referring now to FIG. 3, there is illustrated a message flow and signaling diagram for reconnecting a dropped call in connection with an alternative embodiment of the present invention. As indicated at 70, a call involving a mobile station 10 is in progress. During the call, radio communications between the mobile station 10 and a serving MSC 20 are conducted using a traffic channel (as indicated by a solid line) via a serving radio base station 16 (see FIG. 1). The serving MSC 20, in turn, routes the call through a GMSC 12 to a party in a PSTN 4 or through another MSC to another party within the mobile network 6 (see FIG. 1).

Also during the call, the serving MSC 20 (via the serving RBS 16) periodically transmits a neighboring cell list 72 to the mobile station over the traffic channel (as indicated by a dashed line). The neighboring cell list 72 identifies the control channel for each of the cells that neighbor the serving cell. In this case, the list includes neighbor cells belonging to the serving MSC 20 as well as another MSC (target MSC 30) other than the serving MSC 20. Using this information, the mobile station 10 makes periodic mobile assisted handoff (MAHO) measurements 76, as described in connection with the first embodiment, on the control channel of each neighboring cell both within the area of the serving MSC 20 and the area of the target MSC 30. At step 78, a radio path failure occurs causing the call to be dropped. When the call is dropped, however, the entire call connection is not immediately lost. Instead, only the radio connection (i.e., between the mobile station 10 and the serving RBS 16) is affected; the connection between the serving MSC 20 and the other party to the call is maintained. Although this latter connection is not maintained indefinitely, it is maintained long enough to enable the call to be reconnected in accordance with the present invention.

Upon detecting the call drop, the mobile station 10 selects a suitable control channel from the neighboring cell list received at 72 by identifying a control channel having an acceptable signal strength, as determined from the MAHO measurements 76. Preferably, the mobile station 10 selects the control channel having the highest measured signal strength. In this case, the selected control channel is associated with a target MSC 30 that is different than the serving MSC 20. The mobile station 10 then tunes to the selected control channel and sends an "Origination-Reconnect" message 80 over the RACH of the selected control channel to request that the call be reconnected.

In this case, because the target MSC 30 is not currently handling the call in progress 70, the target MSC 30 cannot identify the call to which the received "Origination-Reconnect" message 80 relates. In accordance with the invention, the target MSC 30 needs to know where the call is currently located or routed to (i.e., the serving MSC 20) in order to reconnect the call. The target MSC 30, in response to the "Origination-Reconnect" message 80, therefore sends a "Registration-Information Request" message 82 to the HLR 32 associated with the mobile station 10. The "Registration-Information Request" message 82 includes an International Mobile Station Identifier (IMSI), or some other mobile station identifier, so that the HLR 32 can identify the mobile station 10 for which information is being requested. In response, the HLR 32 retrieves an identification of the anchor MSC 22 for the mobile station 10 (or, alternatively, an identification of the last MSC in which the mobile station 10 registered) and sends a "Registration-Information Response" 84 to the target MSC 30 containing an identification of the anchor MSC 22 and/or routing information to the anchor MSC 22.

The target MSC 30 then sends a "Route-to-Serving Request" message 86 to the anchor MSC 22, as identified in the "Registration-Information Response" 84, requesting an identification of the current serving MSC 20. Preferably, the "Route-to-Serving Request" message 86 contains the IMSI or some other appropriate mobile station identifier, which the anchor MSC 22 can use to locate the call in progress 70. In response, the anchor MSC 22 retrieves information identifying the serving MSC 20, which is possible because the anchor MSC 22 generally stores an indication of where the call is currently located or where the call has been routed. The anchor MSC 22 sends a "Route-to-Serving Response" message 88 to the target MSC 30 containing an identification of the serving MSC 20 and/or routing information to the serving MSC 20. In some cases, the serving MSC 20 identified in the "Route-to-Serving Response" message 88 will be the same as the anchor MSC 22 (e.g., in cases where the call in progress 70 has not been handed off to another MSC after call initiation).

After receiving an identification of the serving MSC 20 and/or routing information to the serving MSC 20, the target MSC 30 sends a "Handoff Request" 90 to the serving MSC 20. The "Handoff Request" 90 contains the IMSI or some other appropriate mobile station identifier and requests that the call involving the identified mobile station 10 be handed off to the target MSC 30. In response, the serving MSC 20 sends a "HANDMREQ" message 92 to the target MSC 30 granting the request for a handoff. As a result, the serving MSC 20 performs the necessary steps to hand-off the call 70 to the target MSC 30. The handoff of the call can generally be accomplished by rerouting the call to the target MSC 30. The target MSC 30 assigns a traffic channel for use by the mobile station 10, and sends a "Channel Destination" message 94 identifying the assigned traffic channel to the mobile station 10 via the previously selected control channel to which the mobile station 10 is now tuned. The mobile station 10 then reconnects to the call at 96 by tuning to the assigned traffic channel.

In some cases, the HLR 32 might not have a record identifying an anchor MSC 22 for the mobile station 20, or the anchor MSC 22 might not be able to retrieve a record of the call in response to the "Route-to-Serving Request" message 86. For example, the HLR 32 might respond to the "Registration-Information Request" message 82 by indicating that the HLR 32 has no current registration information for the mobile station 10. In such a case, the target MSC 30 can request that the border MSCs search for a call involving the mobile station 10. A border MSC is defined here as an MSC having cells that neighbor the cells of the target MSC 30. Therefore, the searched-for serving MSC 20 would be one of the border MSCs.

Figure 4:
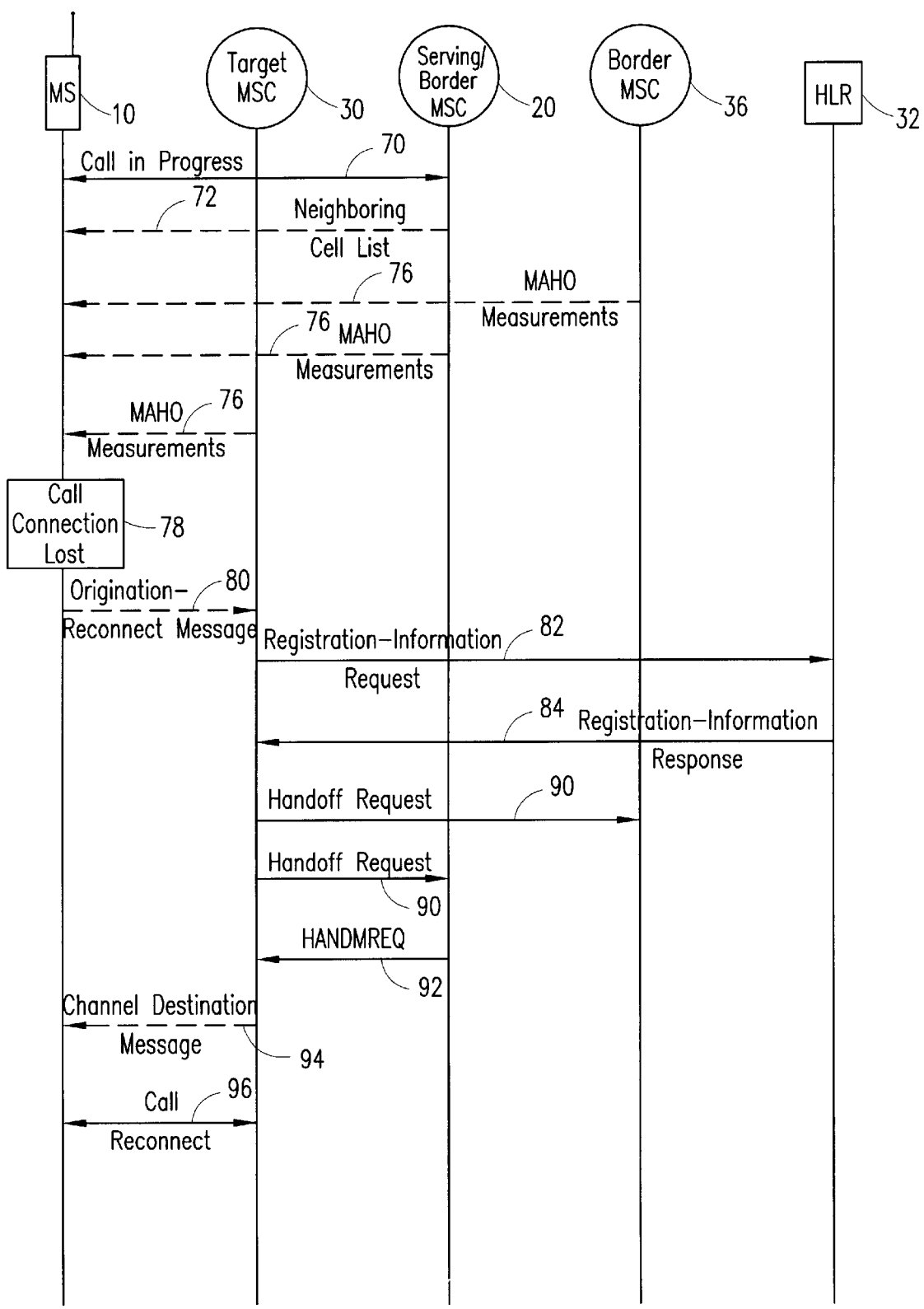
FIG. 4 is a message flow and signaling diagram for reconnecting a dropped call in connection with another embodiment of the present invention, wherein a home location register associated with a mobile station involved in the call can not identify an anchor mobile switching center (MSC) for the call.

Referring now to FIG. 4, there is illustrated a message flow and signaling diagram for reconnecting a dropped call in connection with another embodiment of the present invention, wherein the HLR 32 cannot identify an anchor MSC 22. As discussed in connection with FIG. 3, during a call in progress 70, the mobile station 10 receives a neighboring cell list 72 and periodically makes MAHO measurements 76 on each of the neighboring cells. In this case, however, it is assumed that the mobile station 10 is currently located in a cell of the current serving MSC 20 that is a neighbor to cells in the target MSC 30 and also to cells in another border MSC 36. Thus, the MAHO measurements 76 are made on control channels of cells in the target MSC 30, the serving MSC 20, and the border MSC 36.

Figure 5:
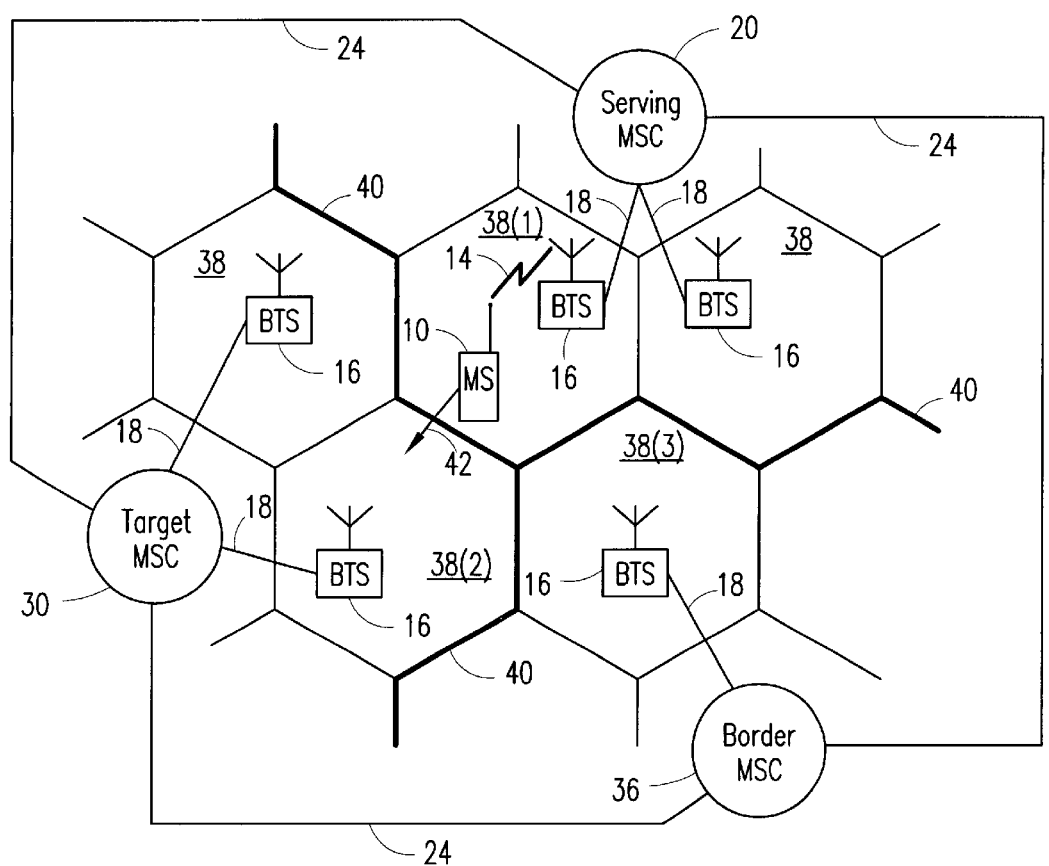
FIG. 5 is a portion of a mobile telecommunications network wherein the service area for three different exchanges border upon one another.

Referring now to FIG. 5, there is illustrated a portion of a mobile telecommunications network 6 wherein the service area for three different exchanges border upon one another. The ongoing call 70 involves a radio interface 14 between the mobile station 10 and the RBS 16 of the currently serving cell 38(1), which is controlled by the serving MSC 20. The currently serving cell 38(1) neighbors a cell 38(2) which is controlled by a target MSC 30 and a cell 38(3) which is controlled by a border MSC 36. The territory served by the various MSCs 20, 30, and 36 is defined by system boundaries 40. The RBS 16 in the serving cell 38(1) transmits the neighboring cell list 72, which identifies the control channels used in all of the neighboring cells, including the control channel for the cell 38(2) being controlled by the target MSC 30 and the control channel for the cell 38(3) being controlled by the border MSC 36.

Referring now to both FIGS. 4 and 5, a radio path failure (i.e., a failure in the air interface 14) occurs causing the call to be dropped at step 78. Upon detecting the call drop, the mobile station 10 selects a suitable control channel, as determined from the MAHO measurements 76. In the illustrated example, the mobile station 10 is moving in a direction indicated by the arrow 42. As a result, the MAHO measurements indicate that the cell 38(2) into which the mobile station 10 is moving is preferred, and the mobile station 10 selects and tunes to a control channel for the cell 38(2) in the target MSC 30. The mobile station 10 sends an "Origination-Reconnect" message 80 over the selected control channel to request that the call be reconnected. Because the target MSC 30 is not currently handling the call in progress 70, the target MSC 30 cannot identify the call to which the received "Origination-Reconnect" message 80 relates. The target MSC 30 therefore sends a "Registration-Information Request" message 82 to the HLR 32 associated with the mobile station 10.

In this case, the HLR 32 cannot identify the anchor MSC 22 for the mobile station 10 (e.g., because the mobile station 10 is not currently registered in any MSC). Thus, the HLR 32 sends a "Registration-Information Response" 84 to the target MSC 30 indicating that an anchor MSC 22 cannot be identified. As a result, the target MSC 30 sends a "Handoff Request" 90 to all the border MSCs having cells 38 that are neighbors to, or that are otherwise near, the cell 38(2) of the target MSC 30 toward which the mobile station 10 is moving. In particular, the target MSC 22 sends the "Handoff Request" 90 to the serving/border MSC 20 and to the border MSC 36. As mentioned above, the "Handoff Request" 90 contains the IMSI or some other appropriate mobile station identifier and requests that the call involving the identified mobile station 10 be handed off to the target MSC 30.

Each of the border MSCs 20 and 36 that receive the "Handoff Request" 90, attempt to locate the call involving the identified mobile station 10. Because the call is currently located in, or routed to, the serving/border MSC 20, the serving MSC 20 is able to locate the call and, in response to the "Handoff Request" 90, sends a "HANDMREQ" message 92 to the target MSC 30 granting the request for a handoff. The border MSC 36, on the other hand, can not locate the call and, as a result, can either not respond to the "Handoff Request" 90 or can send a message indicating that the call could not be located. The serving MSC 20 further performs the necessary steps to hand off the call 70 to the target MSC 30. The target MSC 30 assigns a traffic channel for use by the mobile station 10, and sends a "Channel Destination" message 94 identifying the assigned traffic channel to the mobile station 10 via the previously selected control channel. The mobile station 10 then reconnects to the call at 96 by tuning to the assigned traffic channel.

Figure 6:
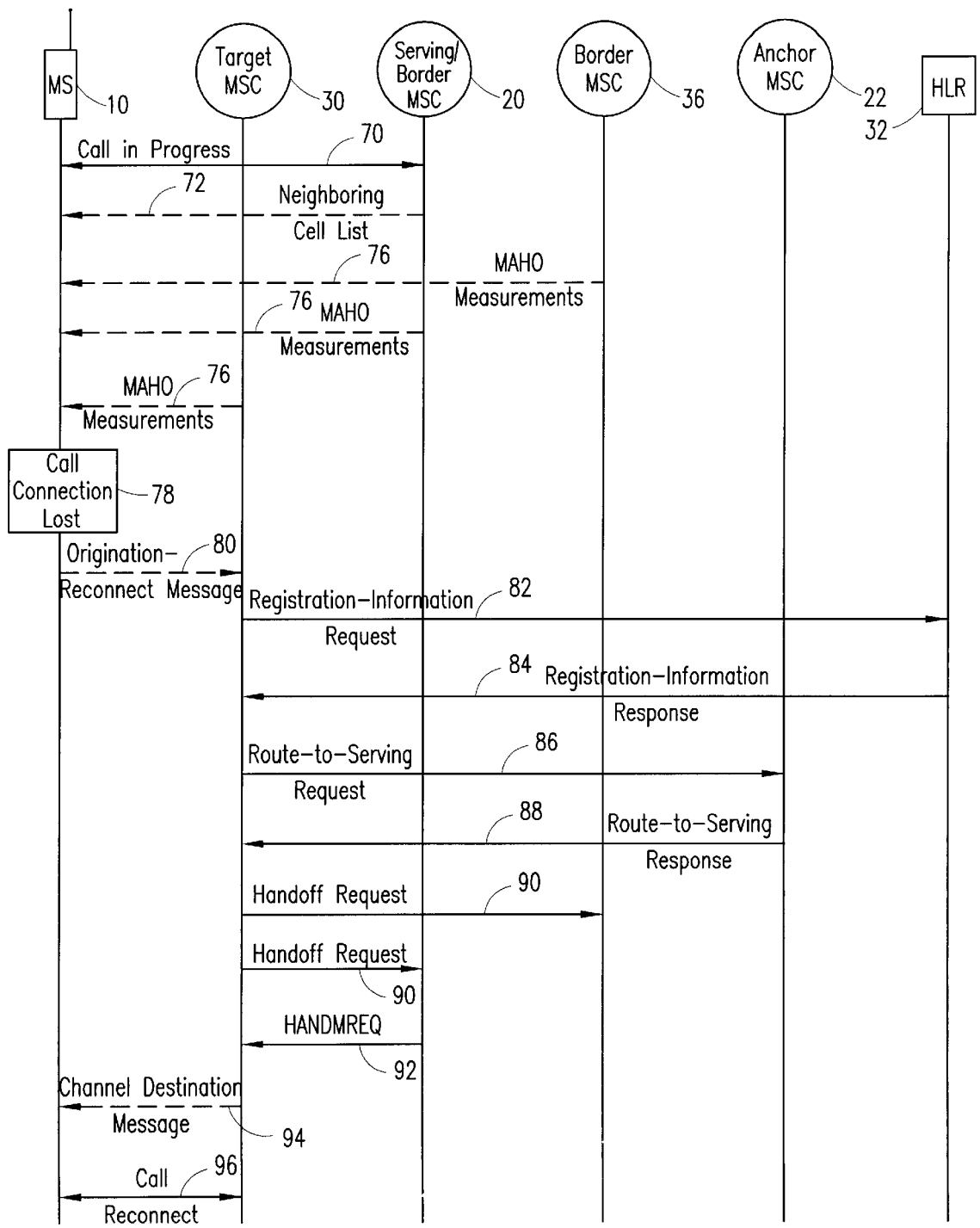
FIG. 6 is a message flow and signaling diagram for reconnecting a dropped call in connection with yet another embodiment of the present invention, wherein the anchor MSC does not have a record of a currently serving MSC for the mobile station.

Referring now to FIG. 6, there is illustrated a message flow and signaling diagram for reconnecting a dropped call in connection with yet another embodiment of the present invention, wherein the anchor MSC 22 does not have a record of the currently serving MSC 20 for the mobile station 10. As discussed in connection with FIGS. 3 and 4 the mobile station 10 receives a neighboring cell list 72 during a call in progress 70 and periodically makes MAHO measurements 76 on each of the neighboring cells. In this case, it is again assumed that the mobile station 10 is currently located in a cell controlled by the current serving MSC 20 that neighbors cells controlled by the target MSC 30 and that neighbors cells controlled by another border MSC 36 (see FIG. 5). Thus, the MAHO measurements 76 are made on control channels of cells in the target MSC 30, the serving MSC 20, and the border MSC 36.

At step 78, a radio path failure (i.e., a failure in the air interface 14) occurs causing the call to be dropped. Upon detecting the call drop, the mobile station 10 selects a suitable control channel, as determined from the MAHO measurements 76. In this example, the mobile station 10 selects and tunes to a control channel for a cell 38 in the target MSC 30. The mobile station 10 then sends an "Origination-Reconnect" message 80 over the selected control channel to request that the call be reconnected. Because the target MSC 30 is not currently handling the call in progress 70, the target MSC 30 cannot identify the call to which the received "Origination-Reconnect" message 80 relates. The target MSC 30 therefore sends a "Registration-Information Request" message 82 to the HLR 32 associated with the mobile station 10. In response, the HLR 32 retrieves an identification of the anchor MSC 22 for the mobile station 10 (or, alternatively, an identification of the last MSC in which the mobile station 10 registered) and sends a "Registration-Information Response" 84 to the target MSC 30 containing an identification of the anchor MSC 22 and/or routing information to the anchor MSC 22.

Next, the target MSC 30 sends a "Route-to-Serving Request" message 86 to the anchor MSC 22 requesting an identification of the current serving MSC 20 for the mobile station 10. The anchor MSC 22 in this case, however, can not locate the serving MSC 20 (e.g., the anchor MSC 22 has no record of the currently serving MSC 20 or of the call). Thus, in response to the "Route-to-Serving Request" message 86, the anchor MSC 22 sends a "Route-to-Serving Response" message 88 to the target MSC 30 indicating that the anchor MSC 22 can not identify the serving MSC 20. As a result, the target MSC 30 sends a "Handoff Request" 90 to all the MSCs having cells 38 that neighbor, or that are otherwise near, the cell 38(2) of the target MSC 30 toward which the mobile station 10 is moving. In particular, the target MSC 22 sends the "Handoff Request" 90 to the serving/border MSC 20 and to the border MSC 36.

Each of the MSCs 20 and 36 that receive the "Handoff Request" 90, attempt to locate the call involving the identified mobile station 10. Because the call is currently located in the serving MSC 20, the serving MSC 20 is able to locate the call and, in response to the "Handoff Request" 90, sends a "HANDMREQ" message 92 to the target MSC 30 granting the request for a handoff. The serving MSC 20 further performs the necessary steps to hand off the call 70 to the target MSC 30. The target MSC 30 assigns a traffic channel for use by the mobile station 10, and sends a "Channel Destination" message 94 identifying the assigned traffic channel to the mobile station 10 via the previously selected control channel. Finally, the mobile station 10 reconnects to the call at 96 by tuning to the assigned traffic channel.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for reconnecting dropped calls in a mobile telecommunications network, comprising the steps of:

receiving a neighboring cell list identifying a plurality of cells at a mobile station;

measuring a signal quality of at least one signal transmitted from at least one of the cells identified in the neighboring cell list;

detecting at the mobile station a radio path loss of a call involving the mobile station;

selecting a target cell based on said signal quality measurement;

transmitting a call reconnect request from the mobile station to the target cell;

requesting an identification of a serving switching node involved in the call from a remote database in response to the call reconnect request; and reconnecting the mobile station to the call in response to the call reconnect request.

2. The method of claim 1, further comprising the step of assigning a traffic channel in the target cell, said assigned traffic channel used to reconnect the mobile station to the call.

3. The method of claim 2, wherein the call uses a traffic channel in a serving cell prior to the radio path loss.

4. The method of claim 3, wherein the serving cell and the target cell are associated with the serving switching node.

5. The method of claim 4, wherein the serving switching node controls assignments of traffic channels in the serving cell and the target cell.

6. The method of claim 3, wherein the radio path loss results from a radio path failure for the call in the serving cell.

7. The method of claim 3, wherein the serving cell is associated with the serving switching node through which the call is routed prior to the radio path loss and the target cell is associated with a target switching node, said method further comprising the step of requesting a handoff of the call from the serving switching node to the target switching node in response to the call reconnect request.

8. The method of claim 7, further comprising the step of retrieving an identification of the serving switching node in response to the call reconnect request, said identification used to request the handoff.

9. The method of claim 7, further comprising the step of requesting a handoff of the call from each of at least one border switching node in response to the call reconnect request, the at least one border switching node including the serving switching node.

10. The method of claim 1, wherein the neighboring cell list identifies a control channel in the target cell, said call reconnect request transmitted on said control channel.

11. A cellular telecommunications system, comprising:
a serving switching node through which a call involving a mobile station is routed;
a serving base station associated with the serving switching node, said first base station in radio contact with a mobile station prior to a loss of said radio contact;
a target base station receiving a call re-connection request from the mobile station after said loss of radio contact; and
a target switching node controlling said target base station, said target switching node assigning a traffic channel in the target base station for use by the mobile station and requesting an identification of the switching node involved in the call from a remote database in response to the call reconnect request, and wherein the target switching node establishes a radio connection on said traffic channel between said call and said mobile station in response to the call re-connection.

12. The system of claim 11, wherein the target switching node further locates said call at the serving switching node and requests a handoff of said call from the serving switching node, the serving switching node handing off control of said call to the target switching node in response to the handoff request.

13. The system of claim 12, wherein said remote database is a home location register.

14. The system of claim 13, wherein the switching node identified by said remote database is an anchor switching node, said target switching node requesting from said anchor switching node an identification of the serving switching node, the anchor switching node sending an identification of the serving switching node in response to the serving switching node identification request.

15. The system of claim 11, wherein the target switching node requests a handoff of said call from at least one border switching node, the at least one border switching node including the serving switching node, the serving switching node handing off control of said call to the target switching node in response to the handoff request.

16. The system of claim 15, further comprising a home location register, wherein the target switching node requests the handoff from the at least one border switching node in response to an indication received from the home location register that current location data for the mobile station is unavailable.

17. The system of claim 15, further comprising an anchor switching node, wherein the target switching node requests the handoff from the at least one border switching node in response to an indication received from the anchor switching node that current location data for the mobile station is unavailable.

18. A method for reconnecting dropped calls in a mobile telecommunications system, comprising the steps of:
detecting at a mobile station a call drop of a call involving the mobile station, said call drop including a loss of a radio link between the mobile station and a serving communication station;
transmitting a call reconnect request from the mobile station to a target communication station associated with a target switching node in response to the detection of the call drop;
requesting an identification of the switching node involved in the call from a remote database in response to the call reconnect request;
locating the call, in response to the call reconnect request, at a switching node involved in the call, wherein said switching node involved in the call differs from the target switching node; and
reconnecting the mobile station to the call using a radio link between the mobile station and the target communication station.

19. The method of claim 18, further comprising the step of selecting the target communication station from a neighboring cell list transmitted to the mobile station from the serving communication station during the call.

20. The method of claim 18, further comprising the steps of:
requesting, in response to the call reconnect request, a handoff of the call from the switching node involved in the call to the target switching node; and
handing off the call from the switching node involved in the call to the target switching node in response to the handoff request.

21. The method of claim 18, wherein the remote database comprises a home location register.

22. The method of claim 18, wherein the remote database is associated with an anchor switching node.

23. The method of claim 18, wherein the switching node involved in the call comprises a serving switching node associated with the serving communication station.

24. The method of claim 18, further comprising the steps of:
requesting, in response to the call reconnect request, a handoff of the call from at least one border switching node to the target switching node, wherein the at least one border includes the switching node involved in the call; and
handing off the call from the switching node involved in the call to the target switching node in response to the handoff request.

* * * * *